(12) United States Patent
Weller et al.

(10) Patent No.: US 9,003,907 B2
(45) Date of Patent: Apr. 14, 2015

(54) DUAL COUPLING GEAR MECHANISM

(71) Applicant: GETRAG Getriebe- und Zahnradfabrik Hermann Hagenmeyer GmbH & Cie KG, Untergruppenbach (DE)

(72) Inventors: Jens Weller, Untergruppenbach (DE); Klaus Kranich, Freiberg (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 0 days.

(21) Appl. No.: 13/887,078

(22) Filed: May 3, 2013

(65) Prior Publication Data

US 2013/0298709 A1 Nov. 14, 2013

(30) Foreign Application Priority Data

May 9, 2012 (DE) .......................... 10 2012 009 484

(51) Int. Cl.
*F16H 3/093* (2006.01)
*F16H 3/00* (2006.01)
(Continued)

(52) U.S. Cl.
CPC ................ *F16H 3/093* (2013.01); *F16H 3/006* (2013.01); *B60K 2006/4825* (2013.01); *F16H 2003/0826* (2013.01); *F16H 2003/0931* (2013.01); *F16H 2200/0056* (2013.01); *Y02T 10/6252* (2013.01)

(58) Field of Classification Search
CPC ... F16H 3/00; F16H 3/006; F16H 2003/0931; F16H 2200/0052; F16H 2200/0056; F16H 3/08; F16H 3/093; F16H 61/0403; F16H 61/0437; F16H 61/2807
USPC ............................ 74/330, 331, 340, 325, 329
See application file for complete search history.

(56) References Cited

U.S. PATENT DOCUMENTS 6,634,247 B2 * 10/2003 Pels et al. ........................ 74/329
7,155,994 B2 1/2007 Gumpoltsberger
(Continued)

FOREIGN PATENT DOCUMENTS

DE 101 33 695 A1 3/2002
DE 103 05 241 A1 9/2004
(Continued)

OTHER PUBLICATIONS

European Search Report; Application No. EP 13 16 5687; Jul. 19, 2013.
Alexander Strube and Uli Christian Blessing, "From Mild to Plug-In—A modular and scalable Torquesplit hybrid by GETRAG," Published by presentation at the JSAE No. 05-10 Symposium "State of the Art Technologies of Power Transmissions 2010" on Nov. 2, 2010, in 5 pAGES, dated Dec. 3, 2014.

*Primary Examiner* — Ha D Ho
*Assistant Examiner* — Jude Agendia
(74) *Attorney, Agent, or Firm* — Knobbe Martens Olson & Bear, LLP (57) ABSTRACT

Dual coupling gear mechanism for a motor vehicle, having a first input shaft and a second input shaft and having a first and a second countershaft, the input shafts and the countershafts being connected to each other by means of a plurality of shiftable wheel sets in order to establish at least seven forward gear stages and at least one reverse gear stage. At least one wheel set has a fixed wheel which is connected to one of the input shafts and two loose wheels which are rotatably supported on the first and on the second countershaft, respectively, and which are in engagement with the fixed wheel. An electric engine is connected to a loose wheel of one of the wheel sets or can be connected thereto by means of a shift clutch.

15 Claims, 5 Drawing Sheets

(51) Int. Cl.
*B60K 6/48* (2007.10)
*F16H 3/08* (2006.01)

(56) References Cited

U.S. PATENT DOCUMENTS

| | | | |
|---|---|---|---|
| 7,287,442 B2* | 10/2007 | Gumpoltsberger | 74/331 |
| 7,604,565 B2 | 10/2009 | Lee et al. | |
| 7,798,030 B2 | 9/2010 | Lang et al. | |
| 8,522,635 B2* | 9/2013 | Pastorello et al. | 74/335 |
| 8,646,349 B2* | 2/2014 | Pesola et al. | 74/325 |
| 8,733,194 B2* | 5/2014 | Mellet et al. | 74/331 |
| 2004/0149080 A1* | 8/2004 | Pollak | 74/661 |
| 2005/0000307 A1* | 1/2005 | Gumpoltsberger | 74/331 |
| 2005/0101432 A1 | 5/2005 | Pels et al. | |
| 2005/0139035 A1 | 6/2005 | Lee et al. | |
| 2005/0193848 A1* | 9/2005 | Gitt | 74/340 |
| 2010/0251840 A1 | 10/2010 | Mohlin et al. | |
| 2011/0138943 A1* | 6/2011 | Mohlin et al. | 74/331 |

FOREIGN PATENT DOCUMENTS

| | | |
|---|---|---|
| DE | 10 2004 062 530 A1 | 10/2005 |
| DE | 10 2004 049 832 A1 | 4/2006 |
| DE | 10 2004 056 936 A1 | 6/2006 |
| DE | 10 2006 036 758 A1 | 2/2008 |
| DE | 10 2007 050 656 A1 | 4/2009 |
| DE | 10 2010 020 856 A1 | 12/2010 |
| DE | 10 2010 033 074 A1 | 3/2011 |
| DE | 10 2010 037 451 | 3/2012 |
| EP | 2 336 599 A2 | 6/2011 |
| EP | 2 385 270 A1 | 11/2011 |
| EP | 2 390 127 A1 | 11/2011 |
| WO | WO 2006/040150 | 4/2006 |

* cited by examiner

DUAL COUPLING GEAR MECHANISM

CROSS-REFERENCE TO RELATED APPLICATIONS

This application claims the priority of German patent application DE 10 2012 009 484, filed May 9, 2012.

BACKGROUND OF THE INVENTION

The present invention relates to a dual coupling gear mechanism for a motor vehicle, having a first input shaft and a second input shaft and having a first and a second countershaft, the input shafts and the countershafts being connected to each other by means of a plurality of switchable wheel sets in order to establish at least seven forward gear stages and at least one reverse gear stage, at least one wheel set having a fixed wheel which is connected to one of the input shafts and two loose wheels which are rotatably supported on the first and on the second countershaft, respectively, and which are in engagement with the fixed wheel.

Dual coupling gear mechanisms are generally known in the prior art. They have two partial gear mechanisms of which one is associated with the even gear stages and the other is associated with the odd gear stages. To this end, dual coupling gear mechanisms have two input shafts which are connected to a dual coupling arrangement which has two friction couplings which can be controlled independently of each other (for example, wet-running multi-disc couplings or dry friction couplings). An input of the dual coupling arrangement is generally connected to a drive motor such as an internal combustion engine. By means of intersecting operation of the two friction couplings, gear changes can be carried out in a manner without traction interruptions.

Such dual coupling gear mechanisms may be arranged in a motor vehicle in the longitudinal direction or transversely relative to the longitudinal direction. In particular in the latter case, there is a great requirement for an axially short structural length. To this end, it is known to arrange two countershafts parallel with an input shaft arrangement, on which loose wheels can be distributed for engaging and disengaging gear stages. In this instance, output wheels of the countershaft are in engagement with an input member of a differential, which distributes drive power to two driven wheels of the motor vehicle.

Furthermore, a significant parameter in the construction of dual coupling gear mechanisms is the spread which generally correlates to the number of gear stages since the gear stages must, for example, be adapted to the characteristic of an internal combustion engine, since an appropriate stepping between the gear stages must be present. In the field of motor vehicle drive trains, there is also generally a requirement to hybridize the drive trains. This is generally intended to be understood to mean that, in addition to a drive motor in the form of an internal combustion engine, there is integrated in the drive train an electric engine which can be operated as a motor in order to provide alternative or additional drive power and/or can be operated in a recovering manner as a generator.

Finally, with such dual coupling gear mechanisms, there is generally to be provided a park locking arrangement which blocks the output of the drive train when a selection switch in the passenger space is in a P-position, that is to say, prevents the vehicle from rolling. Such parking locks may preferably be produced by means of park locking wheels which are securely connected to a shaft which acts directly on the driven wheels. The locking or the unlocking of the park locking arrangement may, for example, be carried out by means of a park locking detent.

In order to achieve an axially short structure, with the above-mentioned three-shaft gear mechanisms which have two countershafts, it is also known to implement a so-called "dual use". With such a dual use, a fixed wheel of the input shaft arrangement is in engagement both with a loose wheel of the one countershaft and with a loose wheel of the other countershaft in order to thus be able to switch two gear stages alternatively by means of the one fixed wheel.

A dual coupling gear mechanism of the type mentioned in the introduction is known from document US 2010/0251840 A1, in which a park locking arrangement is arranged on a separate auxiliary shaft. Document DE 10 2004 056 936 A1 further discloses a similar gear mechanism, which has six forward gear stages. However, both gear mechanisms are not constructed for hybridization. The same applies to a seven gear mechanism which is known from document DE 103 05 241 A1.

Document WO 2006/040150 discloses another dual coupling gear mechanism which has six forward gear stages and a small spread. In this gear mechanism, an electric interior rotor engine is arranged parallel with the input shafts and can be connected by means of one or two clutches to one or two wheel sets of the gear mechanism. Electrical drive power can thereby be supplied to one or both partial gear mechanisms.

Document DE 10 2010 033 074 A1 further discloses a gear mechanism having a single starter coupling, which has two drive units and is constructed in such a manner that an electric engine can be used to support the traction force. The electric engine is connected to an input shaft and is arranged concentrically therewith so that significant limitations with respect to the assembly position of the electric engine are produced. The same applies to a dual coupling gear mechanism which is known from document DE 101 33 695 A1, which has six forward gear stages and which is constructed for a longitudinal assembly in the motor vehicle.

Document DE 10 2007 050 656 A1 discloses a dual coupling gear mechanism in which an electric engine is coupled to an input shaft of one of the partial gear mechanisms. A similar concept is known from document DE 10 2006 036 758 A1 in which an electric engine is securely coupled to the input shafts of the dual coupling gear mechanism, respectively.

A dual coupling gear mechanism with seven forward gear stages is further known from document DE 10 2010 020 856 A1, a park locking arrangement being arranged in this instance on a countershaft or a separate auxiliary shaft. In the first instance, a park locking wheel is orientated axially with respect to a loose wheel of the first forward gear stage. Hybridization is not mentioned in this document.

Finally, there is known from document DE 10 2004 049 832 A1 a dual coupling gear mechanism with seven forward gear stages for front transverse assembly, in which a plurality of toothed wheels of forward gear stages are used to establish a reverse gear stage so that a separate rotation direction reversal wheel is not necessary. However, a complex shift clutch which can connect two loose wheels to each other is required in this instance.

Against the above background, an object of the invention is to provide an improved dual coupling gear mechanism which is optimized with respect to the structural dimensions, in particular in an axial direction, with respect to the spread, with respect to the stepping, with respect to the hybridization and/or with respect to the parking lock implementation.

BRIEF SUMMARY OF THE INVENTION

This object is achieved in the dual coupling gear mechanism mentioned in the introduction in that an electric engine is connected to a loose wheel of one of the wheel sets or can be connected by means of a shift clutch.

In this manner, a hybridization of the dual coupling gear mechanism which has at least seven forward gear stages and which is provided with two countershafts can be produced in a structurally favorable manner. Owing to the connection to a loose wheel, a plurality of operating modes are possible, including a purely electrical drive mode (wherein, for example, both friction couplings of the dual coupling arrangement are open and a shift clutch which is associated with the loose wheel is closed), and including starting the internal combustion engine (as long as the friction coupling is closed which is associated with the input shaft to which a fixed wheel is secured which is in engagement with the loose wheel to which the electric engine is connected). Furthermore, recovery is also possible, in particular also when a partial gear mechanism with which the loose wheel is not associated is active.

Owing to the at least seven gear stages, a high spread can be achieved. The dual coupling gear mechanism according to the invention is particularly suitable for front/transverse assembly in a motor vehicle. Furthermore, a park locking arrangement can readily be achieved in a dual coupling gear mechanism of this type.

The object is consequently completely achieved.

According to a particularly preferred embodiment, the loose wheel, to which the electric engine is connected or can be connected, is associated with the third or the fourth gear stage, in particular a fourth or fifth-highest gear stage of the dual coupling gear mechanism.

With this embodiment, when that gear stage is active, a booster operation can take place via the electric engine, or—in coasting mode—a recovery. As long as the partial gear mechanism which is associated with this gear stage is inactive, the loose wheel can also be connected to the associated countershaft in order to thus carry out at least a recovery operation.

The connection to an intermediate gear stage enables a booster operation, in particular at medium speeds, so that the engine capacity is significantly improved, for example, when overtaking.

According to an embodiment, the electric engine is connected to the loose wheel by means of a toothed wheel, the toothed wheel being in direct engagement with the loose wheel.

In this instance, the electric engine may, for example, have an output shaft, which is directly connected to this toothed wheel. Alternatively, an intermediate toothed wheel may also be interposed in order to adapt the transmission ratios.

In any case, the connection can be carried out from the outer side of the gear mechanism by means of an opening in the gear housing, the toothed wheel being directly in engagement with the relevant loose wheel. The axial structure can also thereby be shortened.

According to an alternative embodiment, the electric engine is connected to the loose wheel by means of a toothed wheel, the toothed wheel being in direct engagement with an auxiliary toothed wheel which is securely connected to the loose wheel.

In this instance, any axial structural space which is available can be used in order to connect the loose wheel to the auxiliary toothed wheel in a rotationally secure manner in order to thus achieve better transmission ratio adaptation.

Generally, it is further advantageous for the electric engine to be able to be connected to a loose wheel which is associated with a forward gear stage, and/or to a loose wheel which is associated with a reverse gear stage.

A connection to a forward gear stage is preferable, for example, in such a manner that a rotor of the electric engine always rotates with the loose wheel. Alternatively, it is also possible to connect the electric engine to the loose wheel by means of a clutch.

Since the electric engine is in each case connected to a loose wheel, it is also possible to provide a motor shaft which carries two toothed wheels, which are connected to the loose wheel of the forward gear stage and to the loose wheel of the reverse gear stage.

According to another preferred embodiment, the electric engine is constructed as an exterior rotor engine.

In this instance, it is possible to secure to the exterior rotor one or more toothed wheels (toothed rings) which are then connected to the loose wheel of the forward gear stage and/or to the loose wheel of the reverse gear stage.

In particular when both a connection to a loose wheel of a forward gear stage and a connection to a loose wheel of a reverse gear stage are desired, it is thus possible to fit to the exterior rotor two toothed rings which are in engagement with the respective loose wheels.

In another preferred embodiment which constitutes a separate invention, a loose wheel which is associated with the seventh forward gear stage is arranged at an end of one of the countershafts opposite the gear input.

Owing to the arrangement of the loose wheel for the highest gear stage at the axial end of the associated countershaft, it is possible to select a smaller bearing diameter for this, whereby it is in turn made possible for a smaller root diameter to be selected for the loose wheel of the seventh gear stage. The spread of the gear mechanism can thereby be increased, for example, to values of above 8, in particular in the range from 8 to 9 and up to 10.

It is preferable for the loose wheel associated with the seventh forward gear stage to be in engagement with a fixed wheel, which is further in engagement with a loose wheel which is associated with another forward gear stage, preferably the fifth forward gear stage.

A dual use is thereby achieved and consequently an axially short structure.

According to another preferred embodiment, in an axial direction between a wheel set which is associated with the first forward gear stage and a shift clutch which shifts this wheel set, there is arranged or orientated a wheel set which is preferably associated with the third forward gear stage.

The associated wheel set contains a fixed wheel which is connected to the one countershaft and which is arranged in an axial direction in a space between the wheel set associated with the first forward gear stage and the associated shift clutch.

It may thereby be necessary for the loose wheel associated with the first forward gear stage to be connected to the shift clutch by means of a stub shaft which bridges the wheel set of the other forward gear stage (preferably the third) in an axial direction.

According to a generally preferred embodiment there are arranged on the first countershaft a loose wheel which is associated with the second forward gear stage, a loose wheel which is associated with the sixth forward gear stage, a loose wheel which is associated with the seventh forward gear stage and a loose wheel which is associated with the first forward gear stage, that is, in this sequence when viewed from a gear input.

The term gear input is preferably intended to be understood to refer to that axial end of the dual coupling gear mechanism at which the input shafts can be connected to a dual coupling arrangement.

An axially compact structure can thereby be achieved.

According to another preferred embodiment, there are arranged on the second forward gear stage a loose wheel which is associated with the reverse gear stage, a loose wheel which is associated with the fourth forward gear stage, a loose wheel which is associated with the fifth forward gear stage and a loose wheel which is associated with the third forward gear stage, that is, in this sequence when viewed from a gear input.

This also contributes to an axially compact structure.

According to another alternative embodiment, there are arranged on the first countershaft a loose wheel which is associated with the second forward gear stage, a loose wheel which is associated with the sixth forward gear stage, a loose wheel which is associated with the first forward gear stage and a loose wheel which is associated with the seventh forward gear stage, that is, in this sequence when viewed from a gear input.

In this embodiment, the wheel set for the gear stage seven may be arranged at an axial end of the dual coupling gear mechanism with the above-described advantages.

According to another preferred embodiment, there is further provision for there to be arranged on the second countershaft a loose wheel which is associated with the reverse gear stage, a loose wheel which is associated with the fourth forward gear stage, a loose wheel which is associated with the third forward gear stage and a loose wheel which is associated with the fifth forward gear stage, that is, in this sequence when viewed from a gear input.

This also contributes to an axially compact structure.

In a variant, it is preferable for loose wheels for the gear stages five and seven to share a fixed wheel and for loose wheels for the gear stages four and six to share a fixed wheel so that two dual uses can be produced.

On the whole, it is further advantageous for a park locking wheel which is connected to one of the countershafts to be orientated or aligned in an axial direction with a loose wheel which is supported on the other countershaft and which is associated with a forward gear stage, in particular the first forward gear stage or the second forward gear stage.

The park locking arrangement can thereby be integrated in the gear mechanism in an axially optimized manner, without additional axial structural space being required and without the provision of a separate shaft for the park locking wheel or the park locking arrangement.

It is further generally advantageous for the loose wheel which is associated with the second forward gear stage to be securely connected to an auxiliary toothed wheel, which is in engagement with a loose wheel which is associated with the reverse gear stage.

The reverse gear stage may thereby be produced as a winding gear stage. In this instance, it is possible to reverse the rotation direction without a separate auxiliary shaft or the like having to be provided for the reverse gear stage.

In all of the above-mentioned embodiments, a dual coupling gear mechanism having seven gear stages may be produced in which the spacings between the input shaft arrangement and the countershafts are constructed in a similar manner, as described in document DE 10 2004 056 936 A1, to which reference will be made in this instance for additional disclosure.

It is further possible to thereby maximize the spread, in this instance with a value greater than 8.5.

Hybridization of the dual coupling gear mechanism is further possible.

Of course, the features mentioned above and those features still to be explained below can be used not only in the combination set out but also in other combinations or alone, without departing from the scope of the present invention.

BRIEF DESCRIPTION OF THE SEVERAL VIEWS OF THE DRAWING

Figure 1:
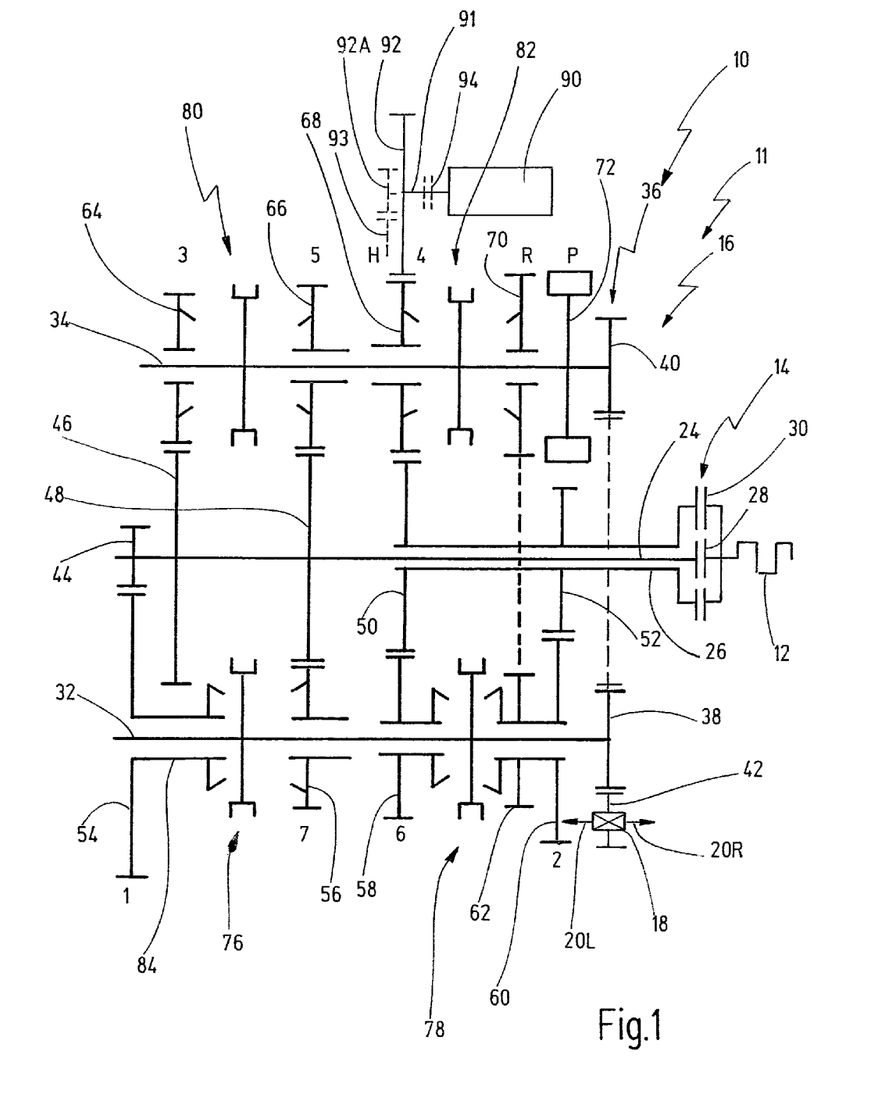
FIG. 1 is a schematic illustration of a drive train of a motor vehicle having a first embodiment of a dual coupling gear mechanism according to the invention.

Embodiments of the invention are illustrated in the drawings and are explained in greater detail in the following description. In the drawings:

FIG. 1 is a schematic illustration of a drive train 10 for a motor vehicle 11.

DETAILED DESCRIPTION OF THE INVENTION

The drive train 10 contains a drive motor 12 such as an internal combustion engine, whose output shaft is connected to the input of a dual coupling arrangement 14. The outputs of the dual coupling arrangement 14 are connected to the input arrangement of a dual coupling gear mechanism 16. An output of the dual coupling gear mechanism 16 is connected to a differential which distributes drive power to two driven wheels 20L, 20R.

The drive train is constructed for transverse assembly, in particular for front transverse assembly, in the motor vehicle 11.

The dual coupling gear mechanism 16 contains a first input shaft 24 which is constructed as a solid shaft, and a second input shaft 26 which is constructed as a hollow shaft concentric with the first input shaft 24. The first input shaft 24 is connected to an output member of the first coupling 28 of the dual coupling arrangement 14. The second input shaft 26 is connected to an output member of a second coupling 30 of the dual coupling arrangement 14.

The dual coupling gear mechanism 16 further has a first countershaft 32 and a second countershaft 34 which are each arranged offset in a parallel manner relative to the input shafts 24, 26. The countershafts 32, 34 are connected to the differential 18 by means of an output wheel set 36. The output wheel set 36 contains a first fixed wheel 38, which is connected to the first countershaft 32, and another fixed wheel 40 which is connected to the second countershaft 34. The two fixed wheels 38, 40 are in engagement with the drive wheel 42 of the differential 18.

There are secured to the first gear input shaft 24, when viewed from an axial end of the dual coupling gear mechanism 16 opposite the gear input, a first fixed wheel 44 for the forward gear stage 1, a second fixed wheel 46 for the forward gear stage 3 and a third fixed wheel 48 for the forward gear stages 5, 7. Correspondingly, when viewed from the axial end opposite the gear input, there are secured to the second input shaft 26 a first fixed wheel 50 for the forward gear stages 4, 6 and a second fixed wheel 52 for the forward gear stage 2 and for the reverse gear stage R.

There are rotatably supported on the first countershaft 32, again when viewed from the axial end opposite the gear input, a first loose wheel 54 for the forward gear stage 1, another loose wheel 56 for the forward gear stage 7, another loose wheel 58 for the forward gear stage 6 and another loose wheel 60 for the forward gear stage 2. The loose wheel 60 for the forward gear stage 2 is securely connected to an auxiliary toothed wheel 62 which serves to establish the reverse gear stage R, as explained below.

There are rotatably supported on the second countershaft 34, again when viewed from the axial end opposite the gear input, a first loose wheel 64 for the forward gear stage 3, another loose wheel 66 for the forward gear stage 5, another loose wheel 68 for the forward gear stage 4 and another loose wheel 70 for the reverse gear stage R.

The fixed wheels 38, 40 of the output wheel set 36 are arranged adjacent to the gear input, a park locking wheel 72 being secured to the second countershaft 34 between the fixed wheel 40 and the loose wheel 70 for the reverse gear stage R. The park locking wheel 72 is orientated in an axial direction with the loose wheel 60 for the forward gear stage 2.

There is arranged between the loose wheels 54, 56 a first shift clutch package 76 having two shift clutches for engaging and disengaging the forward gear stages 1, 7. A second shift clutch package 78 is arranged between the loose wheels 58, 60 for engaging and disengaging the forward gear stages 6, 2.

A third shift clutch package 80 is arranged on the second countershaft 34 between the loose wheel 64 for the forward gear stage 3 and the loose wheel 66 for the forward gear stage 5 for engaging and disengaging these forward gear stages. Finally, a fourth shift clutch package 82 is arranged on the second countershaft 34 between the loose wheel 68 for the forward gear stage 4 and the loose wheel 70 for the reverse gear stage R for engaging and disengaging these gear stages.

The fixed wheel 44 is in engagement with the loose wheel 54. The fixed wheel 46 is in engagement with the loose wheel 64. The fixed wheel 48 is in engagement with the loose wheels 56, 66. The fixed wheel 50 is in engagement with the loose wheels 58, 68. The fixed wheel 52 is in engagement with the loose wheel 60.

The auxiliary toothed wheel 62 is in engagement with the loose wheel 70 for the reverse gear stage R in order thus to achieve a reversal of the rotation direction, without having to provide a separate auxiliary shaft.

The wheel set 46, 64 for the forward gear stage 3 is arranged in an axial direction between the wheel set 54, 44 for the forward gear stage 1 and the shift clutch package 76. To this end, the loose wheel 54 is connected to the first shift clutch package 76 by means of a stub shaft 84.

The park locking wheel 72 serves to establish a park locking arrangement P which has, for example, a park locking detent which is not illustrated in greater detail.

In the dual coupling gear mechanism 16, two dual uses for the gear stages 5, 7 and 4, 6 are produced. Furthermore, the park locking wheel 72 is axially aligned with the loose wheel 60 for the forward gear stage 2. In this manner, an axially compact structure can generally be achieved. By means of the auxiliary toothed wheel 62, an appropriate transmission ratio for the reverse gear stage R can be adjusted.

An electric engine 90 is connected to the loose wheel 68 for the forward gear stage 4. This loose wheel 68 therefore serves to hybridize H the dual coupling gear mechanism 16. The electric engine 90 has an output shaft 91 which is orientated parallel with the shafts 24, 26, 32, 34 and is connected to a toothed wheel 92. The toothed wheel 92 is in engagement with the loose wheel 68 for the forward gear stage 4.

Alternatively, it is possible to connect the engine shaft 91 to a toothed wheel 92A which is connected to the loose wheel 68 by means of an additional intermediate toothed wheel 93.

The electric engine 90 may thus be securely coupled to the loose wheel 68. Alternatively, it is possible to connect the electric engine 90 to the loose wheel 68 or to disconnect it therefrom by means of a shift clutch 94.

The dual coupling gear mechanism 16 can be constructed with or without this hybridization H. The same applies to the dual coupling gear mechanisms explained below which generally correspond in terms of structure and operation to the dual coupling gear mechanism 16 of FIG. 1. The same elements are therefore given the same reference numerals. The differences are substantially explained below.

Figure 2:
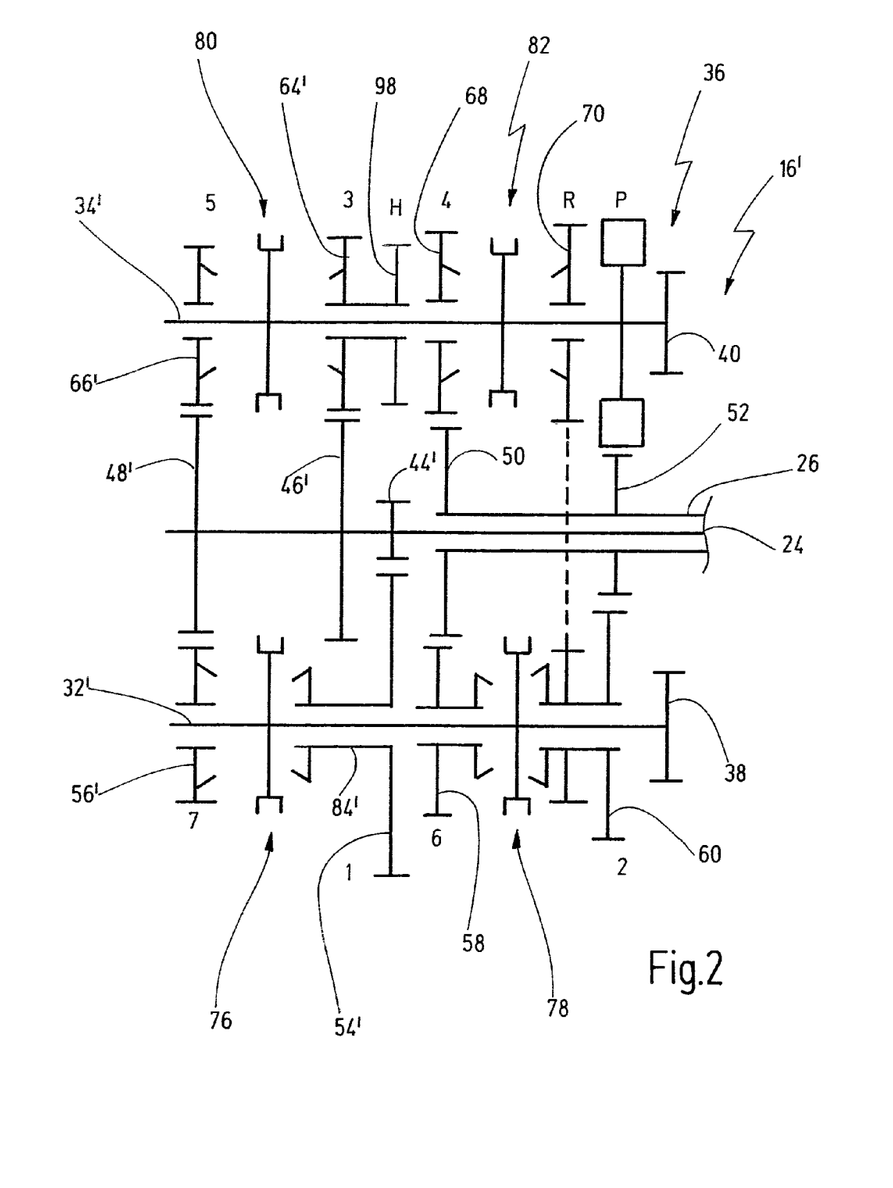
FIG. 2 is another embodiment of a dual coupling gear mechanism according to the invention.

FIG. 2 shows a dual coupling gear mechanism 16' in which the wheel sets associated with the first input shaft 24 are axially transposed. At the end opposite the gear input, a fixed wheel 48' is consequently connected to the first input shaft 24 and is in engagement with a loose wheel 66' for the forward gear stage 5 on the second countershaft 34' and with a loose wheel 56' for the forward gear stage 7 on the first countershaft 32'. Owing to the arrangement of the loose wheel 56' for the highest gear stage at the axial end, the loose wheel 56' may be constructed with a smaller base diameter so that greater spread of the gear mechanism can be produced.

In this embodiment, the loose wheel 54' for the forward gear stage 1 is arranged between the loose wheel 56' for the forward gear stage 7 and the loose wheel 58 for the forward gear stage 6, which loose wheel 54' is in engagement with a fixed wheel 44' of the first input shaft 24. The wheel set 46', 64' for the forward gear stage 3 is arranged in an axial direction between the wheel set 44', 54' and the first shift clutch package 76. In this instance, the loose wheel 54' is in turn connected to the first shift clutch package 76 by means of a stub shaft 84'.

In axial alignment with the wheel set 44', 54' for the first forward gear stage, there is arranged an auxiliary toothed wheel 98 which is rigidly connected to the loose wheel 64' for the forward gear stage 3. The auxiliary toothed wheel 98 is used in this instance for the hybridization H, an electric engine 90 being able to be connected thereto in the same manner as described with reference to FIG. 1.

Figure 3:
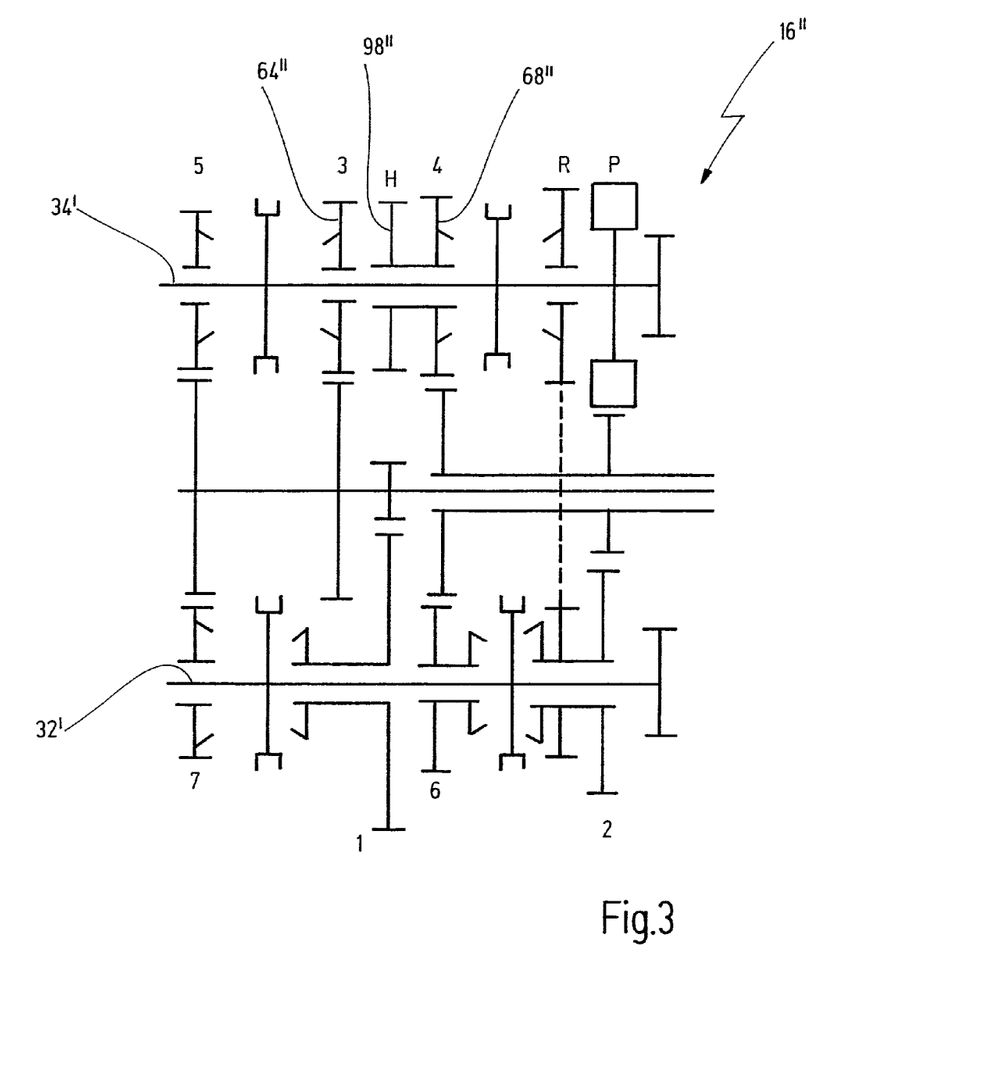
FIG. 3 is another embodiment of a dual coupling gear mechanism according to the invention.

FIG. 3 shows another dual coupling gear mechanism 16" which generally corresponds to the dual coupling gear mechanism 16' of FIG. 2 in terms of structure and operation. Elements which are the same are therefore given the same reference numerals. The differences are substantially explained below.

In the dual coupling gear mechanism 16", not the loose wheel 64" for the forward gear stage 3, but instead the loose wheel 68" for the forward gear stage 4 is rigidly connected to an auxiliary toothed wheel 98" which can be used for hybridization H and which is axially aligned with the wheel set for the forward gear stage 1.

Figure 4:
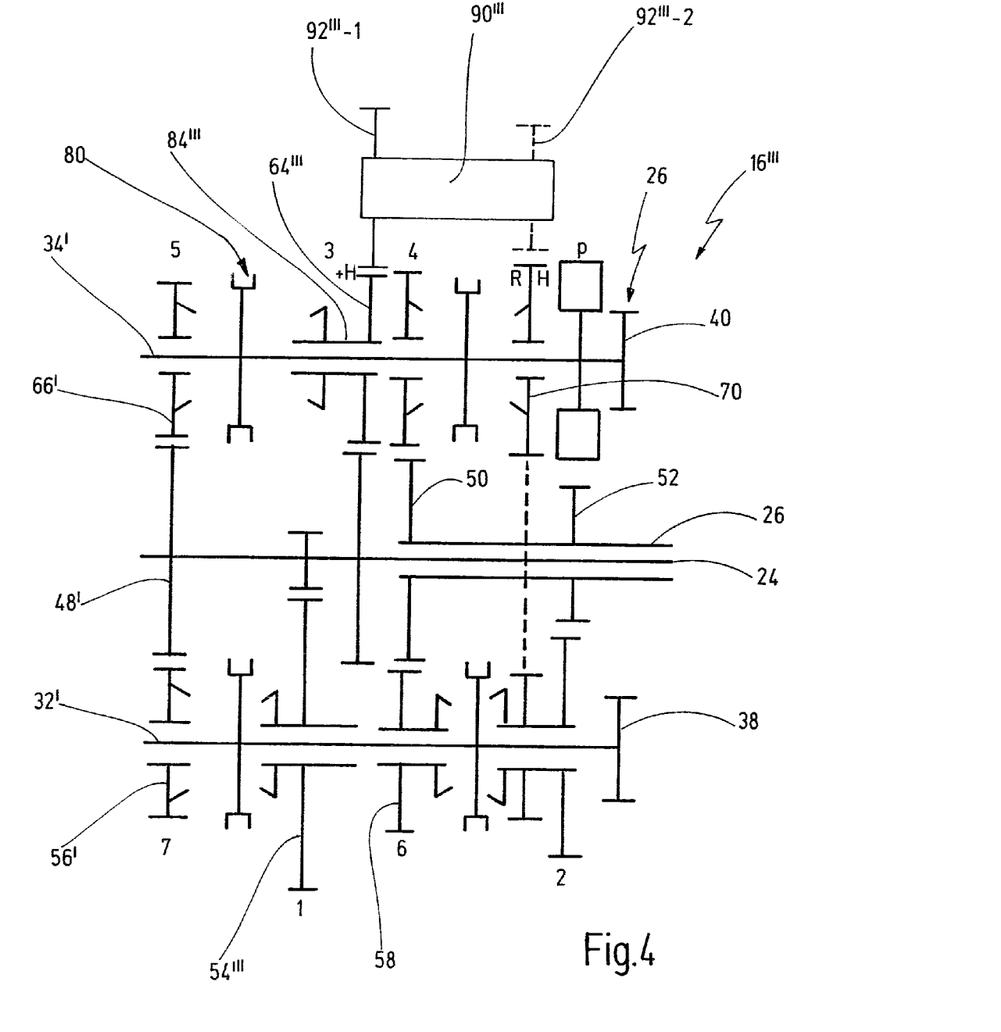
FIG. 4 is another embodiment of a dual coupling gear mechanism according to the invention.

FIG. 4 shows another embodiment of a dual coupling gear mechanism 16''' which generally corresponds to the dual coupling gear mechanism 16" of FIG. 3 in terms of structure and operation. Elements which are the same are therefore given the same reference numerals. The differences are substantially explained below.

In the dual coupling gear mechanism 16''', in a similar manner to in the dual coupling gear mechanism 16 of FIG. 1, a loose wheel for a forward gear stage is directly connected to an electric engine, that is to say, not by means of an auxiliary toothed wheel as in FIGS. 2 and 3.

In this instance, the loose wheel 64''' is constructed to establish the forward gear stage 3 and for hybridization. The axial positions of the wheel set for the forward gear stage 1 and the wheel set for the forward gear stage 3 are transposed with respect to the embodiments of FIGS. 2 and 3. That is to say, the wheel set for the forward gear stage 3 including the loose wheel 64''' is arranged in an axial direction between the loose wheel 54''' for the forward gear stage 1 and the loose wheel 58 for the forward gear stage 6. It is thereby possible to move the loose wheel 64''' in an axial direction closer to the gear input. In this instance, it may be preferable for the loose wheel 64''' to be connected to the third shift clutch package 80 by means of a stub shaft 84'''.

In this instance, there is further provided for hybridization an electric engine 90''' which is constructed as an exterior rotor engine. A first toothed wheel 92'''-1 or a second toothed wheel 92'''-2 in the form of toothed rings are secured to the exterior rotor of the electric engine 90'''. The first toothed wheel 92'''-1 is in direct engagement with the loose wheel 64''' for the forward gear stage 3. In the other case, the second toothed wheel 92'''-2 is in direct engagement with the loose wheel 70 for the reverse gear stage R. In this variant, a hybridization by means of an exterior rotor engine can be used which is mounted in the direct vicinity of the toothed wheels of the shaft 34'. A very compact arrangement of the hybrid drive is thereby produced.

Figure 5:
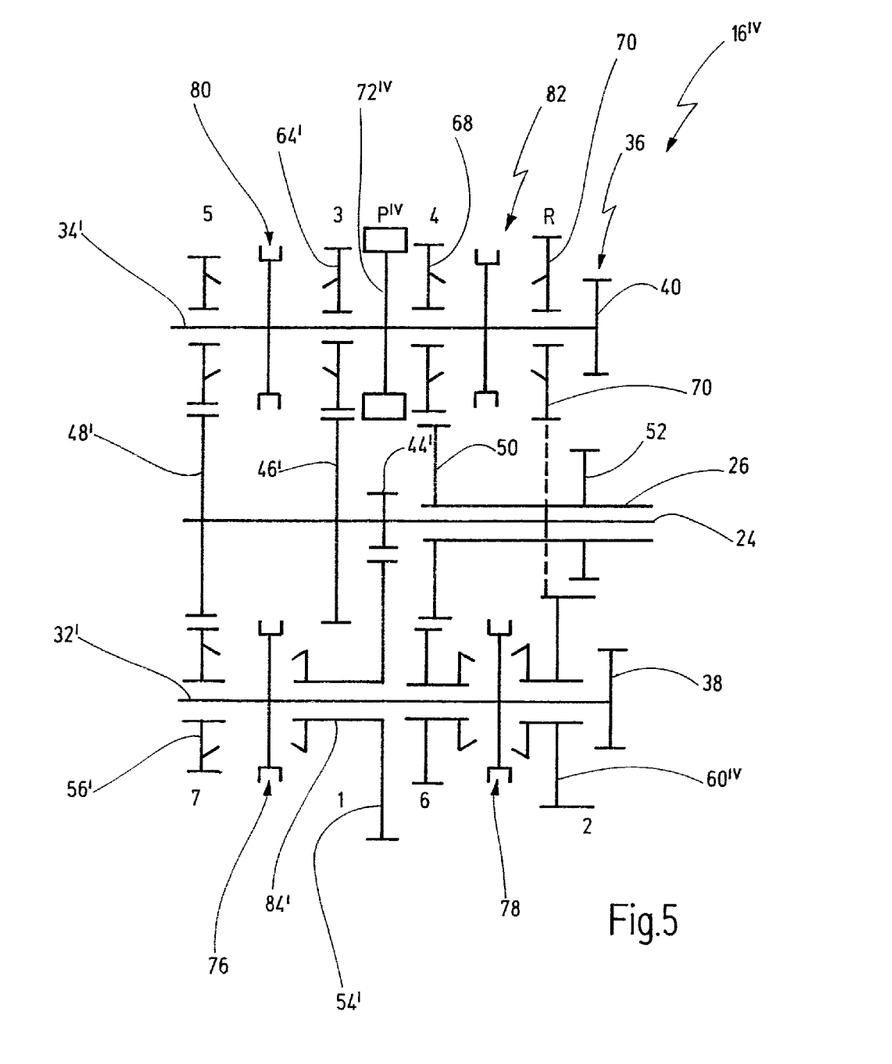
FIG. 5 is another embodiment of a dual coupling gear mechanism according to the invention.

FIG. 5 shows another embodiment of a step-change gear mechanism $16^{IV}$ which generally corresponds to the step-change gear mechanism 16' of FIG. 2 in terms of structure and operation. Elements which are the same are therefore given the same reference numerals. The differences are substantially explained below.

In the dual coupling gear mechanism $16^{IV}$, a park locking wheel $72^{IV}$ of a park locking arrangement $P^{IV}$ is securely connected to the second countershaft 34' and arranged in an axial direction between the loose wheel 64' for the forward gear stage 3 and the loose wheel 68 for the forward gear stage 4. In this variant, the park locking wheel $72^{IV}$ is orientated axially with the wheel set 44', 54' for the forward gear stage 1. In this variant, the park locking arrangement can be actuated in a simple manner by means of a shift drum or the like since the park locking wheel $72^{IV}$ is arranged in an axial direction between the shift clutch packages 80, 82.

In this variant, the loose wheel $60^{IV}$ of the forward gear stage 2 is directly in engagement with the loose wheel 70 for the reverse gear stage R and the fixed wheel 52 on the shaft 26. Consequently, the loose wheel $60^{IV}$ may be constructed so as to be axially shorter than, for example, the above-mentioned loose wheel 60 together with the auxiliary toothed wheel 62 thereof. The shift clutch 78 can thereby be moved closer to the gear input side and may be arranged so as to be substantially orientated with respect to the shift clutch package 82. A relatively simple arrangement of the shift actuation can thereby be enabled by means of a shift drum.

What is claimed is:

1. Dual coupling gear mechanism for a motor vehicle, having a first input shaft and a second input shaft and having a first and a second countershaft, the input shafts and the countershafts being connected to each other by means of a plurality of shiftable wheel sets in order to establish at least seven forward gear stages and at least one reverse gear stage, wherein at least one wheel set has a fixed wheel which is connected to one of the input shafts and has two loose wheels which are rotatably supported on the first and on the second countershaft, respectively and which are in engagement with the fixed wheel,
wherein an electric engine is connected to a loose wheel of one of the wheel sets, wherein the electric engine is connected to the loose wheel by means of a toothed wheel, the toothed wheel being in direct engagement with a toothed wheel which is securely connected to the loose wheel.

2. Dual coupling gear mechanism according to claim 1, wherein the loose wheel is associated with the third gear stage or the fourth gear stage.

3. Dual coupling gear mechanism according to claim 1, wherein the electric engine can be connected to a loose wheel which is associated with a forward gear stage, or to a loose wheel which is associated with a reverse gear stage.

4. Dual coupling gear mechanism according to claim 1, wherein the electric engine is constructed as an exterior rotor engine.

5. Dual coupling gear mechanism according to claim 1, wherein a loose wheel which is associated with the seventh forward gear stage is arranged at an end of one of the countershafts opposite the gear input.

6. Dual coupling gear mechanism according to claim 5, wherein the loose wheel associated with the seventh forward gear stage is in engagement with a fixed wheel which is further in engagement with a loose wheel which is associated with another forward gear stage.

7. Dual coupling gear mechanism according to claim 5, wherein in an axial direction between a wheel set associated with the first forward gear stage and a shift clutch which switches this wheel set, there is arranged a wheel set which is associated a forward gear stage.

8. Dual coupling gear mechanism according to claim 1, wherein there are arranged on the first countershaft a loose wheel which is associated with the second forward gear stage, a loose wheel which is associated with the sixth forward gear stage, a loose wheel which is associated with the seventh forward gear stage and a loose wheel which is associated with the first forward gear stage, that is, in this sequence when viewed from a gear input.

9. Dual coupling gear mechanism according to claim 1, wherein there are arranged on the second countershaft a loose wheel which is associated with the reverse gear stage, a loose wheel which is associated with the fourth forward gear stage, a loose wheel which is associated with the fifth forward gear stage and a loose wheel which is associated with the third forward gear stage, that is, in this sequence when viewed from a gear input.

10. Dual coupling gear mechanism according to claim 1, wherein there are arranged on the first countershaft a loose wheel which is associated with the second forward gear stage, a loose wheel which is associated with the sixth forward gear stage, a loose wheel which is associated with the first forward gear stage and a loose wheel which is associated with the seventh forward gear stage, that is, in this sequence when viewed from a gear input.

11. Dual coupling gear mechanism according to claim 1, wherein there are arranged on the second countershaft a loose wheel which is associated with the reverse gear stage, a loose wheel which is associated with the fourth forward gear stage, a loose wheel which is associated with the third forward gear stage and a loose wheel which is associated with the fifth forward gear stage, that is, in this sequence when viewed from a gear input.

12. Dual coupling gear mechanism according to claim 1, wherein a park locking wheel which is connected to one of the countershafts is orientated in an axial direction with a loose wheel which is supported on the other countershaft and which is associated with a forward gear stage.

13. Dual coupling gear mechanism according to claim 12, wherein the forward gear stage is the second forward gear stage or the first forward gear stage.

14. Dual coupling gear mechanism according to claim 1, wherein the loose wheel which is associated with the second forward gear stage is securely connected to an auxiliary toothed wheel which is in engagement with a loose wheel which is associated with the reverse gear stage.

15. Dual coupling gear mechanism for a motor vehicle, having a first input shaft and a second input shaft and having a first and a second countershaft, the input shafts and the countershafts being connected to each other by means of a plurality of switchable wheel sets in order to establish at least seven forward gear stages and at least one reverse gear stage, wherein the seventh forward gear stage represents the highest gear stage, wherein at least one wheel set has a fixed wheel which is connected to one of the input shafts and has two loose wheels which are rotatably supported on the first and on the second countershaft, respectively and which are in engagement with the fixed wheel, wherein there are arranged on the first countershaft a loose wheel which is associated with the second forward gear stage, a loose wheel which is associated with the sixth forward gear stage, a loose wheel which is associated with the first forward gear stage and a loose wheel which is associated with the seventh forward gear stage, that is, in this sequence when viewed from a gear input, and wherein there are arranged on the second countershaft a loose wheel which is associated with the reverse gear stage, a loose wheel which is associated with the fourth forward gear stage, a loose wheel which is associated with the third forward gear stage and a loose wheel which is associated with the fifth forward gear stage, that is, in this sequence when viewed from a gear input.

* * * * *